United States Patent [19]

Gillard et al.

[11] Patent Number: 5,329,360

[45] Date of Patent: Jul. 12, 1994

[54] MULTIPLEXING AND DEMULTIPLEXING IMAGE DATA

[75] Inventors: Clive H. Gillard, Basingstoke; James H. Wilkinson, Tadley, both of United Kingdom

[73] Assignee: Sony United Kingdom Limited, Staines, United Kingdom

[21] Appl. No.: 9,669

[22] Filed: Jan. 27, 1993

[30] Foreign Application Priority Data

Feb. 28, 1992 [GB] United Kingdom ............. 9204312

[51] Int. Cl.$^5$ ........................................ H04N 11/04
[52] U.S. Cl. ................................ 348/472; 348/488; 348/473
[58] Field of Search ............... 358/12, 13, 11, 133, 358/141, 140, 135, 136, 14, 142; H04N 11/02, 11/04, 11/06, 11/08, 7/13

[56] References Cited

U.S. PATENT DOCUMENTS

| | | | |
|---|---|---|---|
| 4,829,378 | 5/1989 | LeGall | 358/133 |
| 4,974,071 | 11/1990 | Maeda | 358/13 |
| 5,036,391 | 7/1991 | Auvray et al. | 358/133 |
| 5,038,202 | 8/1991 | Ooishi et al. | 358/13 |
| 5,121,205 | 6/1992 | Ng et al. | 358/141 |
| 5,148,272 | 9/1992 | Acampura et al. | 358/135 |

FOREIGN PATENT DOCUMENTS 0213090  9/1991  Japan ............................. H04N 11/4

Primary Examiner—James J. Groody
Assistant Examiner—Michael H. Lee
Attorney, Agent, or Firm—William S. Frommer; Alvin Sinderbrand

[57] ABSTRACT

Image data multiplexing apparatus for multiplexing digital luminance and chrominance data of a representation of an image into multiplexed data blocks of a predetermined length, along with a corresponding demultiplexing apparatus, is described. Each of the multiplexed data blocks comprises a luminance data section comprising luminance data from a portion of the representation, a chrominance data section comprising chrominance data from the portion of the representation, a portion address indicative of the position in the representation of the portion, and a block offset pointer indicative of the position in the multiplexed data block of the boundary between the luminance data section and the chrominance data section.

25 Claims, 10 Drawing Sheets

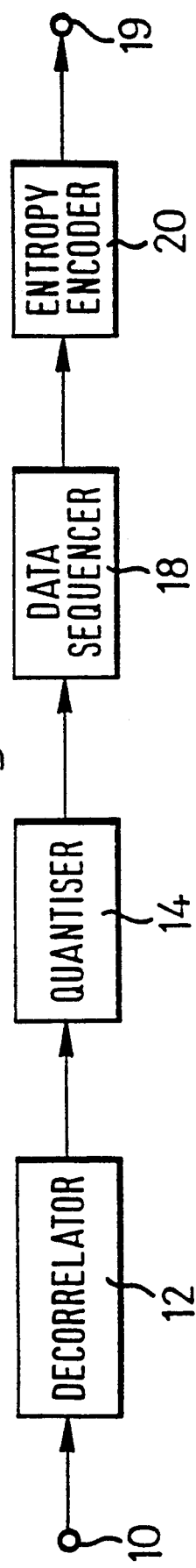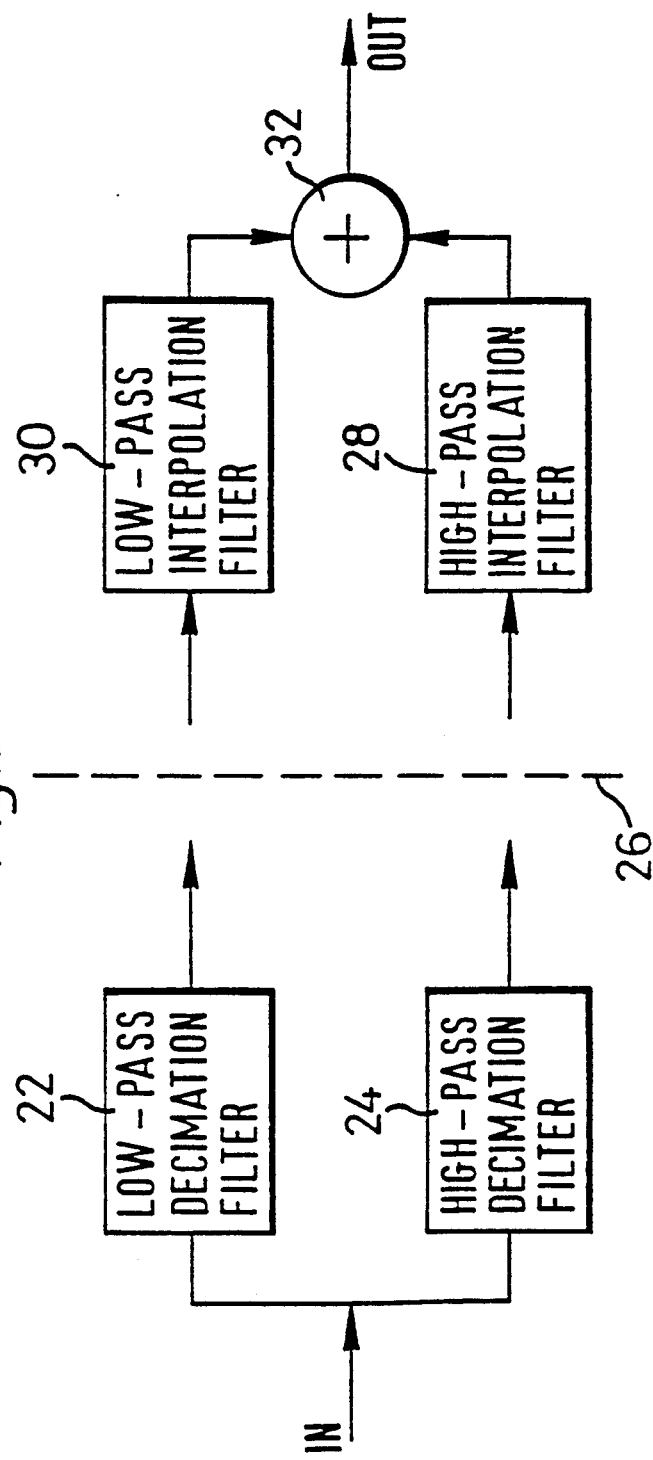

MULTIPLEXING AND DEMULTIPLEXING IMAGE DATA

BACKGROUND OF THE INVENTION

1. Field of the Invention

This invention relates to multiplexing and demultiplexing image data.

2. Description of the Prior Art

In known image transmission or storage apparatus, representations of the luminance and chrominance components of an image are transmitted or stored in digital form. An example of such an apparatus is a component digital video tape recorder (DVTR) in which representations of the luminance and chrominance components of successive fields of a video signal are recorded by one or more rotary magnetic heads as successive slant recording tracks on a magnetic tape medium. During normal replay, one or more rotary magnetic replay heads follow the recorded slant tracks and read the image data recorded thereon.

A problem occurs during shuttle (high speed) replay of a magnetic tape recorded on a DVTR. During shuttle replay it is necessary to reproduce the recorded luminance and chrominance image information with sufficient quality that an operator can locate an approximate desired position on the tape. The longitudinal tape speed in shuttle replay is greater than that used during recording, which has the effect that a rotary magnetic replay head does not follow a single recorded slant track along the track's entire active length, but instead crosses a number of recorded slant tracks as it traverses the tape. This means that if a rotary magnetic replay head first crosses a recorded slant track part of the way through the image data recorded on the track, it may not be possible to determine which portion of the image corresponds to the image data read by the replay head from that track. Also, because only part of the image data on each recorded slant track is read, it is possible that the luminance and chrominance information used to reconstruct a particular portion of a single video field may have originated in two or more different fields. This may cause subjective distortion of the reconstructed images.

This problem can be particularly severe in a DVTR employing a data compression system to reduce the quantity of data which has to be recorded by the DVTR. One proposed method of image data compression is to use a data quantiser followed by an entropy encoder to effect compression of the image data, with the size of the resultant compressed image data depending on the parameters used and the information content of the particular image. In these systems a compressed representation of the image is recorded on the magnetic tape medium. Because the image data has been subjected to compression resulting in compressed data whose length depends on the image's information content, image data recorded at corresponding positions on two tracks may relate to entirely different portions of the representation. This means that it is particularly difficult to determine which portion of the representation corresponds to the image data read by a rotary replay head as the head crosses from one recorded slant track to another during shuttle replay.

SUMMARY OF THE INVENTION

This invention provides an image data multiplexing apparatus having means for multiplexing digital luminance and chrominance data of a representation of an image into multiplexed data blocks of a predetermined length, said means for multiplexing being operable to form multiplexed data blocks, each of said multiplexed data blocks comprising:

(i) a luminance data section comprising luminance data from a portion of said representation;

(ii) a chrominance data section comprising chrominance data from said portion of said representation;

(iii) a portion address indicative of a position in said representation of said portion; and (iv) a block offset pointer indicative of a position in said multiplexed data block of a boundary between said luminance data section and said chrominance data section.

A multiplexed data block produced by image data multiplexing apparatus according to the invention is self contained in that it contains luminance and chrominance information from the same portion of the representation of the image, address information indicating the position of the portion of the representation, and a pointer to indicate the boundary between the luminance and chrominance data within the multiplexed data block. In this way, although all of the image data from a complete recorded slant track in a DVTR may not be read during shuttle replay, substantially all of the multiplexed data blocks which are, successfully read by a replay head can be decoded and used. Also, although during shuttle replay the representation may contain image information from a number of video fields, corresponding luminance and chrominance data in the representation will originate from the same image or video field (i.e. from the same multiplexed data block). This can contribute to a reduction in the distortion of the luminance and chrominance pictures reconstructed during shuttle replay.

The representation of the image to be multiplexed may be direct (i.e. not compressed), or may be compressed or transformed prior to multiplexing. The invention is particularly applicable for use with an image representation comprising frequency separated image data representing the image in the two-dimensional spatial frequency domain. The data may be frequency separated by means of transform techniques such as the discrete cosine transform (DCT), but in a preferred embodiment the representation comprises a plurality of sub-bands of the image in the two-dimensional spatial frequency domain.

The portion address may indicate the individual position of each item of luminance and chrominance data from the portion of the representation, but it is preferred that the representation comprises a plurality of data elements having a predetermined order so that the portion address need only indicate the position in the representation of one data element in the portion, such as the data element in the portion which is first in the predetermined order.

Although the chrominance data can be treated as a single category of data, in one preferred embodiment the chrominance data section comprises a first data subsection and a second data subsection representing respective colour difference data from the portion of the representation. Each of the multiplexed data blocks may include a chrominance offset pointer indicative of the position in that multiplexed data block of the boundary between the first data subsection and the second data subsection.

It is preferred that the apparatus comprises means for concatenating a block header with the luminance and chrominance data sections, the block header comprising the portion address and the block offset pointer. In this case it is also preferable to employ means for receiving data comprising luminance data and chrominance data from corresponding positions in the representation; a counter for determining when the quantity of the received data reaches a predetermined quantity; and means for controlling the concatenating means to concatenate the block header with the received data to form a multiplexed data block when the quantity of the received data reaches the predetermined quantity. The counter may comprises a luminance data counter for detecting the quantity of received luminance data; a chrominance data counter for detecting the quantity of received chrominance data; means for comparing the sum of the quantities of received luminance data and received chrominance data with the predetermined quantity; and means for deriving the block offset pointer from the quantity of received luminance data.

Viewed from a second aspect this invention provides an image data demultiplexing apparatus for demultiplexing a multiplexed data block having luminance and chrominance data sections into digital luminance and chrominance data from a portion of a representation of an image, said image data demultiplexing apparatus comprising:

(i) a luminance data store;

(ii) a chrominance data store;

(iii) means for reading a portion address from said multiplexed data block;

(iv) means for reading from said multiplexed data block a block offset pointer indicative of a position in said multiplexed data block of a boundary between said luminance data section and said chrominance data section, for use in controlling reading of said luminance data section and said chrominance data section in dependence on said block offset pointer;

(v) means for reading luminance data from said luminance data section and storing said luminance data in a portion of said luminance data store dependent on said portion address; and (vi) means for reading chrominance data from said chrominance data section and storing said chrominance data in a portion of said chrominance data store dependent on said portion address.

In a preferred embodiment the chrominance data section comprises a first data subsection and a second data subsection representing respective colour difference data from the portion of the representation. In this case the image data demultiplexing apparatus could comprise means for reading from the multiplexed data block a chrominance offset pointer indicative of the position in that multiplexed data block of the boundary between the first data subsection and the second data subsection. An alternative way of detecting the boundary between the first and the second data subsections is that in which the image data demultiplexing apparatus comprises: a first chrominance data store for storing chrominance data from the first data subsection; a second chrominance data store storing chrominance data from the second data subsection; means for detecting a portion end address representing the end of the portion of the luminance data store in which luminance data from each multiplexed data block is written; means for reading chrominance data from the chrominance data section and storing the chrominance data in the first chrominance data store until the address in the first chrominance data store peaches the portion end address; and means for reading the remainder of the chrominance data in the chrominance data section and storing that chrominance data in the second chrominance data store.

Preferably the demultiplexing apparatus comprises means for reading a block header from the multiplexed data block, the block header comprising the portion address and the block offset pointer.

Viewed from a third aspect this invention provides a method of multiplexing digital luminance and chrominance data of a representation of an image into multiplexed data blocks of a predetermined length, said method comprising the steps of:

(i) writing luminance data from a portion of said representation to form a luminance data section in a multiplexed data block;

(ii) writing chrominance data from said portion of said representation to form a chrominance data section in said multiplexed data block;

(iii) writing a portion address to said multiplexed data block, said portion address being indicative of a position in said representation of said portion; and (iv) writing a block offset pointer to said multiplexed data block, said block offset pointer being indicative of a position in said multiplexed data block of a boundary between said luminance data section and said chrominance data section.

Viewed from a fourth aspect this invention provides a method of demultiplexing a multiplexed data block having luminance and chrominance data sections into digital luminance and chrominance data from a portion of a representation of an image, said method comprising:

(i) reading a portion address from said multiplexed data block;

(ii) reading from said multiplexed data block a block offset pointer indicative of a position in said multiplexed data block of a boundary between said luminance data section and said chrominance data section, for use in controlling reading of said luminance data section and said chrominance data section in dependence on said block offset pointer;

(iii) reading luminance data from said luminance data section and storing said luminance data in a portion of a luminance data store dependent on said portion address; and (iv) reading chrominance data from said chrominance data section and storing said chrominance data in a portion of a chrominance data store dependent on said portion address.

A complementary aspect of this invention is that of a multiplexed image data signal comprising a plurality of successive multiplexed data blocks of a predetermined length, each of said multiplexed data blocks comprising:

(i) a luminance data section comprising luminance data from a portion of a representation of an image;

(ii) a chrominance data section comprising chrominance data from said portion of said representation;

(iii) a portion address indicative of a position in said representation of said portion; and (iv) a block offset pointer indicative of a position in said multiplexed data block of a boundary between said luminance data section and said chrominance data section.

This invention is particularly useful when employed in image data recording/reproducing apparatus, which may also comprise a luminance data compressor operable to supply luminance data to the image data multiplexing apparatus; and a chrominance data compressor operable to supply chrominance data to the image data multiplexing apparatus, and/or a luminance data decompressor operable to receive luminance data from the image data demultiplexing apparatus; and a chrominance data decompressor operable to receive chrominance data from the image data demultiplexing apparatus.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 is a schematic illustration of a data compression system for use in the apparatus of FIG. 1;

FIG. 3 is a schematic illustration of one stage of sub-band coding;

DESCRIPTION OF THE PREFERRED EMBODIMENTS

Figure 1:
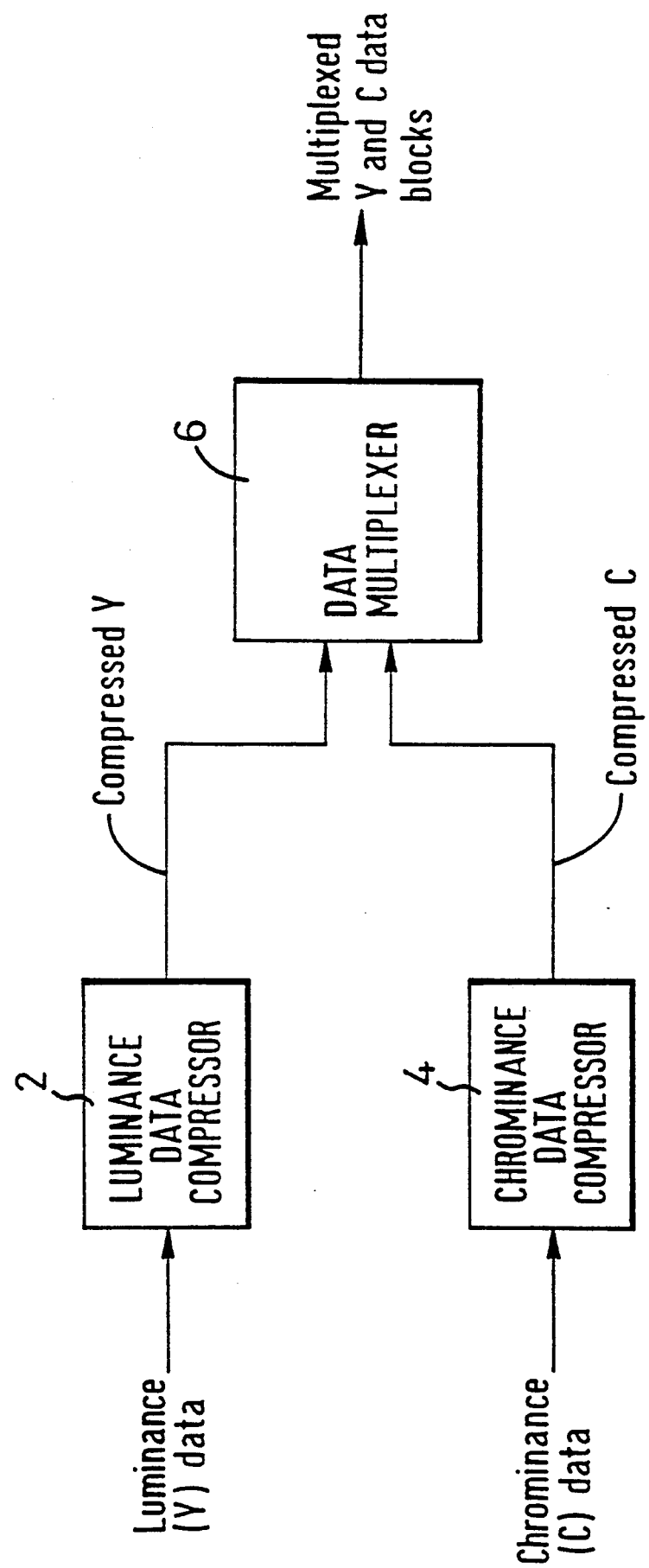
FIG. 1 is a schematic illustration of an image data compression and multiplexing apparatus.

Referring now to FIG. 1, an image multiplexing system is shown in which luminance and chrominance components of an input digital video signal are separately compressed and then multiplexed together to form a single multiplexed output signal. An input luminance (Y) data signal is supplied to a luminance data compressor 2 and an input chrominance (C) data signal is supplied to a chrominance data compressor 4. The input luminance and chrominance data signals are in digital form and each comprise successive multi-bit (for example 8-bit) samples or words representing the luminance or chrominance values of respective pixels of a scanned image or picture.

The compressed outputs of the luminance data compressor 2 and the chrominance data compressor 4 are supplied to a data multiplexer 6 which multiplexes the compressed luminance and chrominance data into multiplexed data blocks. Each of the multiplexed data blocks contains a portion of the compressed luminance data and a portion of the compressed chrominance data. The multiplexed data blocks may then be recorded or transmitted; on subsequent replay or reception the data blocks are supplied to a data demultiplexer (not shown in FIG. 1) which separates out the compressed luminance and chrominance data for subsequent decompression by a luminance decompressor and a chrominance decompressor respectively.

The luminance data compressor 2 and the chrominance data compressor 4 will now be described in further detail with reference to FIGS. 2 to 8. The data multiplexer 6 and a corresponding data demultiplexer will then be described with reference to FIGS. 9 to 15.

FIG. 2 shows an apparatus for effecting intra-image frequency separation and compression of a video signal in the two-dimensional spatial frequency domain. The apparatus shown in FIG. 2 is suitable for use as a luminance data compressor 2 or a chrominance data compressor 4.

In FIG. 2, input image data representing the luminance or chrominance components of an image is applied via an input 10 to a decorrelator 12. Frequency separated image data is fed by the decorrelator 12 to a quantiser 14 and then via a data sequencer 18 to an entropy encoder 20, which together compress the frequency separated image data provided by the decorrelator 12 to produce a compressed signal on an output 19. The compressed signal can subsequently be restored substantially to its original form by expansion by way of entropy decoding, resequencing, dequantising and correlation operations which employ parameters converse to those used for decorrelation, sequencing, quantisation and entropy encoding, respectively, upon compression.

The operation of decorrelation performed in the decorrelator 12 relies upon the fact that neighbouring pixels of an image are highly correlated, whereby processing an image (for example, a field of frame of a video signal) to form frequency separated signal portions representing different components of the image in the two-dimensional spatial frequency domain enables a reduction in the amount of information needed to represent the image. Specifically, the frequency separated signal portions represent different spatial frequency components of the image.

The sequencing operation will be described in more detail below.

The quantisation operation, which is a lossy operation, in that it involves deliberate discarding of some frequency data considered to be redundant or of little importance to adequate perception of the image by the human psychovisual system, in itself enables some signal compression to be achieved. The quantiser 14 enables compression to be achieved in two ways: it reduces the number of levels to which the data input to it can be assigned, and it increases the probability of runs of zero value samples on the data it outputs. The ability to achieve enhanced signal compression provided by the operation of the quantiser is carried into effect in the entropy encoder 20 in that the reduction in information content achieved in the quantiser 14 enables a consequential bit (data) rate reduction to be achieved in the entropy encoder.

Further (non-lossy) compression, and bit (data) rate reduction, is provided in the entropy encoder 20 in which, in known manner, using for example variable length coding, the data produced by the quantiser 14 is encoded in such a manner that more probable (more frequently occurring) items of data produce shorter output bit sequences than less probable (less frequently occurring) ones. In this regard, the decorrelation operation has the effect of changing the probability distribution of the occurrence of any particular signal level, which is substantially the same as between the different possible levels before decorrelation, into a form in which it is much more probable that certain levels will occur than others.

The compression/coding system or apparatus as shown in FIG. 2 can be embodied in a variety of ways, using different forms of decorrelation. An increasingly popular form of implementation makes use of so-called transform coding, and in particular the form of transform known as the discrete cosine transform. The use of discrete cosine transformation for decorrelation is in fact prescribed in a version of the compression system of FIG. 2 described in a proposed image data compression standard prepared by the Joint Photographic Experts Group and currently under review by the International Standards Organisation. According to the transform technique of decorrelation, the signal is subjected to a linear transform (decorrelation) operation prior to quantisation and encoding. A disadvantage of the transform technique is that, although the whole image (for example, a whole field) should be transformed, this is impractical in view of the amount of data involved. The image (field) thus has to be divided into blocks (for example, of $8 \times 8$ samples representing respective pixels), each of which is transformed. That is, transform coding is complex and can be used on a block-by-block basis only.

A recently proposed approach to compression/coding in the frequency domain is that of sub-band coding. In this approach, the decorrelator 12 in the system of FIG. 2 would comprise a spatial (two-dimensional) sub-band filtering arrangement which divides the input image data into a plurality of uncorrelated sub-bands each containing the spatial frequency content of the image in a respective one of a plurality of areas of a two-dimensional frequency plane of the image, the sub-bands then being selectively quantised by the quantiser 14 in accordance with their positions in the sensitivity spectrum of the human psychovisual system. That is, decorrelation is achieved in this case by putting the energy of the overall image into different sub-bands of the two-dimensional spatial frequency domain. Sub-band filtering is believed to provide better decorrelation than the transform approach. Also, unlike the transform technique, there is no restriction to operation on a block-by-block basis: the sub-band filtering can be applied directly to the image data.

FIG. 3 illustrates a sub-band coding system in which the input image data is passed through a low-pass decimation filter 22 and a high-pass decimation filter 24. The resulting two output signals represent different portions of the frequency spectrum of the input signal. The two signals are then quantised, sequenced and entropy encoded as discussed in relation to FIG. 2. The sub-band components of the input signal can now be passed for further processing by the data multiplexer 6 shown in FIG. 1. Such further processing is illustrated by the dashed line 26 in FIG. 3.

At decompression the sub-band components are passed through corresponding matching filters to regenerate the original frequency components. These matching filters are a low-pass interpolation filter 30 and a high-pass interpolation filter 28. The outputs of the interpolation filters 28, 30 are added by a summation circuit 32 to yield the original input image data.

Figure 4:
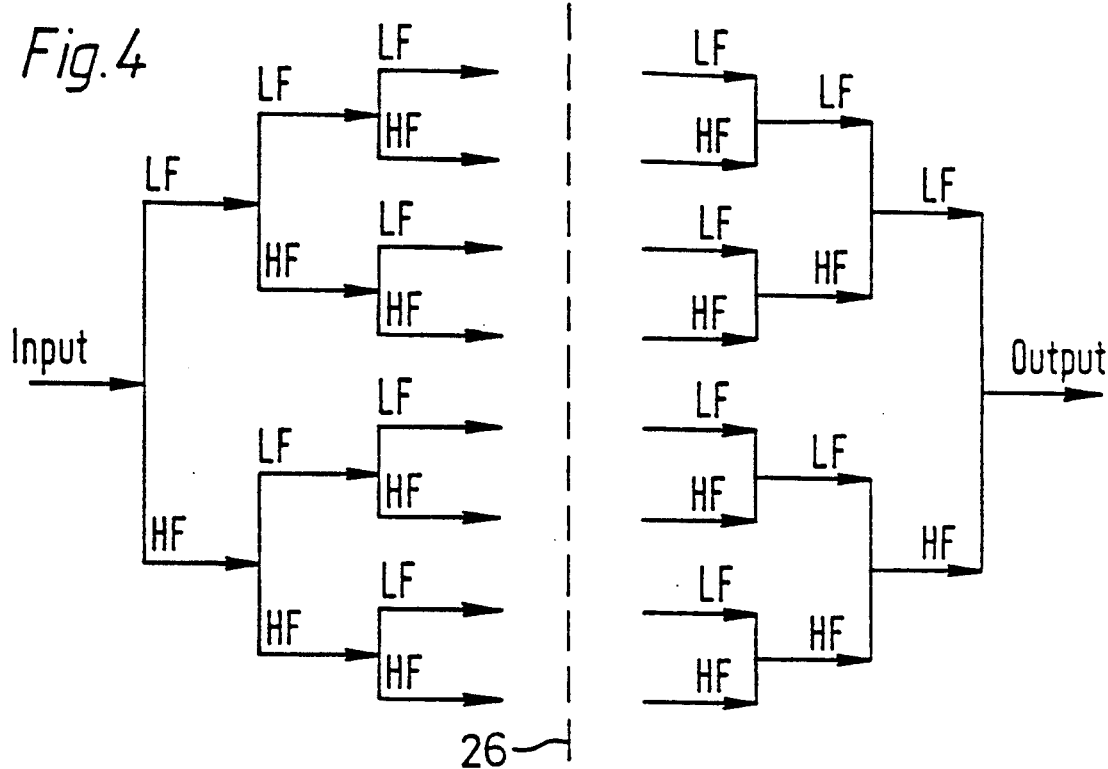
FIG. 4 is a schematic illustration of a higher order sub-band coding system.

FIG. 3 illustrates the decomposition of the input image data into two sub-bands. In practice, the input image data would be decomposed into many more sub-band components. FIG. 4 illustrates the decomposition of an input signal into eight sub-band components and its subsequent recombination into output image data.

The filters of the sub-band coding system comprise finite impulse response filters with appropriate delays and weighting coefficients to perform both horizontal and vertical frequency decomposition. Different forms of filter for performing sub-band frequency separation are known, e.g. some possible filters are described in the article entitled 'Exact Reconstruction Techniques for Tree Structured Sub-Band Coders', in IEEE Transactions on Acoustics, Speech and Signal Processing, Volume ASSP-34 at pages 434 to 441, June 1986.

Figure 5:
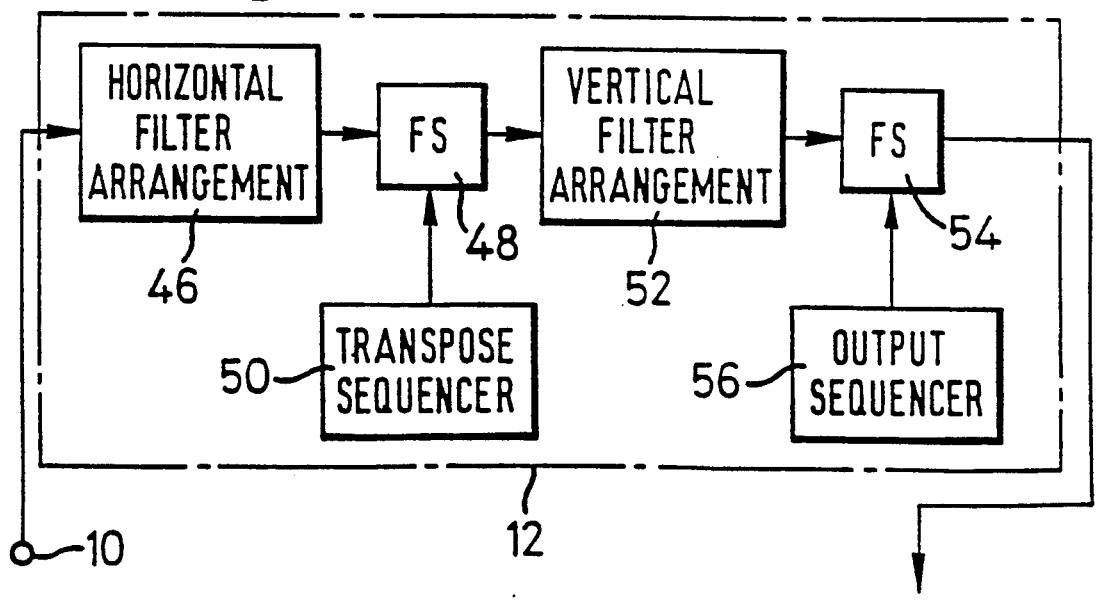
FIG. 5 illustrates a two-dimensional sub-band decorrelator.

FIG. 5 illustrates the decorrelator 12 of FIG. 2 in more detail. The decorrelator comprises a horizontal filter arrangement 46, an intermediate field store 48, a transpose sequencer (address generator) 50, a vertical filter arrangement 52, an output field store 54 and an output sequencer (address generator) 56. Sub-band filtering is effected on a separable basis. Thus, in FIG. 5, filtering in the two orthogonal image directions, namely the horizontal direction (the direction of image scanning in the case of conventional video) and the vertical direction, is effected entirely independently and separately of one another by respective one-dimensional filtering operations performed in the horizontal and vertical filter arrangements 46 and 52, respectively.

The horizontal filter arrangement 46 and vertical filter arrangement 52 can be of substantially the same construction as one another. Thus, the construction of the horizontal filter arrangement 46 only will be described in detail. The filtering is to achieve 8 sub-bands in each of the horizontal and vertical directions, that is to say that a square array of 64 ($8 \times 8$) sub-bands is to be produced. The 64 sub-bands are to be of equal extent to one another.

The horizontal filter arrangement 46 is preferably of a tree or hierarchical structure as shown in FIG. 4, comprising three successive filter stages. The first stage comprises a low pass filter (LF) and a high pass filter (HF), each of which is followed by a respective decimator (not shown). The LF filter, HF filter and the decimators together make up a quadrature mirror filter (QMF). Each of the filters can be a finite impulse response filter of conventional form. In use, a line of the input image data is applied, sample-by-sample, to the first stage, to be low pass filtered and high pass filtered by the LF and HF, respectively. Thus, the LF and HF produce outputs comprising low pass filtered and high pass filtered versions of the input line, respectively, the outputs representing the spatial frequency content of the line in the lower and upper halves of the horizontal spatial frequency range. That is, the first stage divides the input line into two sub-bands in the horizontal direction. The decimators decimate (sub-sample) the respective outputs by a factor of two, whereby the total number of samples outputted by the decimators (together) is the same as the total number of samples in the line.

The second stage is of similar construction to the first stage, except that there are two QMFs each as in the first stage and the output from each of the decimators of the first stage is passed as an input to a respective one of the two QMFs. Thus, the second stage produces four outputs representing the spatial frequency content of the line in four equal quarters of the horizontal spatial frequency range. That is, the second stage further divides the two sub-bands, into which the input line was divided in the first stage, into four sub-bands in the horizontal direction. The four decimators of the second stage decimate (sub-sample) the respective outputs by a factor of two, whereby the total number of samples outputted by the decimators of the second stage (together) is the same as the total number of samples in the line.

The third stage is of similar construction to the first stage, except that there are four QMFs each as in the first stage and the output from each of the four decimators of the second stage is passed as an input to a respective one of the four QMFs. Thus, the third stage produces eight outputs representing the spatial frequency content of the line in eight equal one-eighths of the horizontal spatial frequency range. That is, the third stage divides the four sub-bands into which the input line was previously divided into the required eight sub-bands in the horizontal direction. The eight decimators of the third stage decimate (sub-sample) the respective outputs by a factor of two, whereby the total number of samples outputted by the decimators of the third stage (together) is the same as the total number of samples in the line.

The eight outputs of the third stage, that is of the horizontal filter arrangement 46, are passed to the intermediate field store 48 and stored at positions corresponding to respective one-eighths of a first line thereof. The above process of horizontal filtering is then repeated for all the other lines of the field of the input digital image data. This results in the intermediate field store 48 containing a version of the field of the input digital image data that has been filtered into eight sub-bands in the horizontal direction (only). Each line of the field stored in the intermediate field store 48 is divided into eight portions each containing the horizontal spatial frequency information in a respective one of eight sub-bands of the horizontal spatial frequency range of the image that the original field represented. Thus, the horizontally filtered field stored in the intermediate field store 48 can be considered to be divided into eight columns.

The horizontally filtered field stored in the intermediate field store 48 is then fed (under the control of the transpose sequencer 50) into the vertical filter arrangement 52, in which it is filtered into eight sub-bands in the vertical direction in similar manner to that in which filtering into eight sub-bands in the horizontal direction was achieved in the horizontal filter arrangement 46. The horizontally and vertically filtered field is fed on a line-by-line basis into the output field store 54 to be passed from there to the quantiser 14. The store 54 can be considered to have been partitioned into an array of 64 (8×8) storage regions, in each of which a respective one of the 64 sub-bands is stored as a respective array of data elements. Thus, successive fields of the input digital image data are sub-band filtered and passed, duly filtered, to the quantiser 14 after a delay of two field intervals.

The transpose sequencer 50 produces read addresses fop the intermediate field store 48, to control reading of the contents thereof into the vertical filter arrangement 52, as follows. As will be recalled, the signal as stored in the intermediate field store 48 comprises the lines of the original field, each divided horizontally into eight sub-bands. That is, the signal as stored in the intermediate field store 48 can, as mentioned above, be considered to comprise eight columns. To enable the signal stored in the intermediate field store 48 to be vertically filtered by hardware of the same construction (the vertical filter arrangement 52) used to horizontally filter it, it must be transposed, that is rotated through 90 degrees, as it is read to the vertical filter arrangement 52, so that it comprises eight rows (as opposed to columns). The transpose sequencer 50 addresses the intermediate field store 48 in such a manner as to accomplish this.

The nature of the filtering produced by the combination of the horizontal filter arrangement 46 and the vertical filter arrangement 52 is such that data stored in the output field store 54 is somewhat scrambled and must be reordered by the output sequencer 56 before being passed to the rest of the apparatus for processing.

Figure 6:
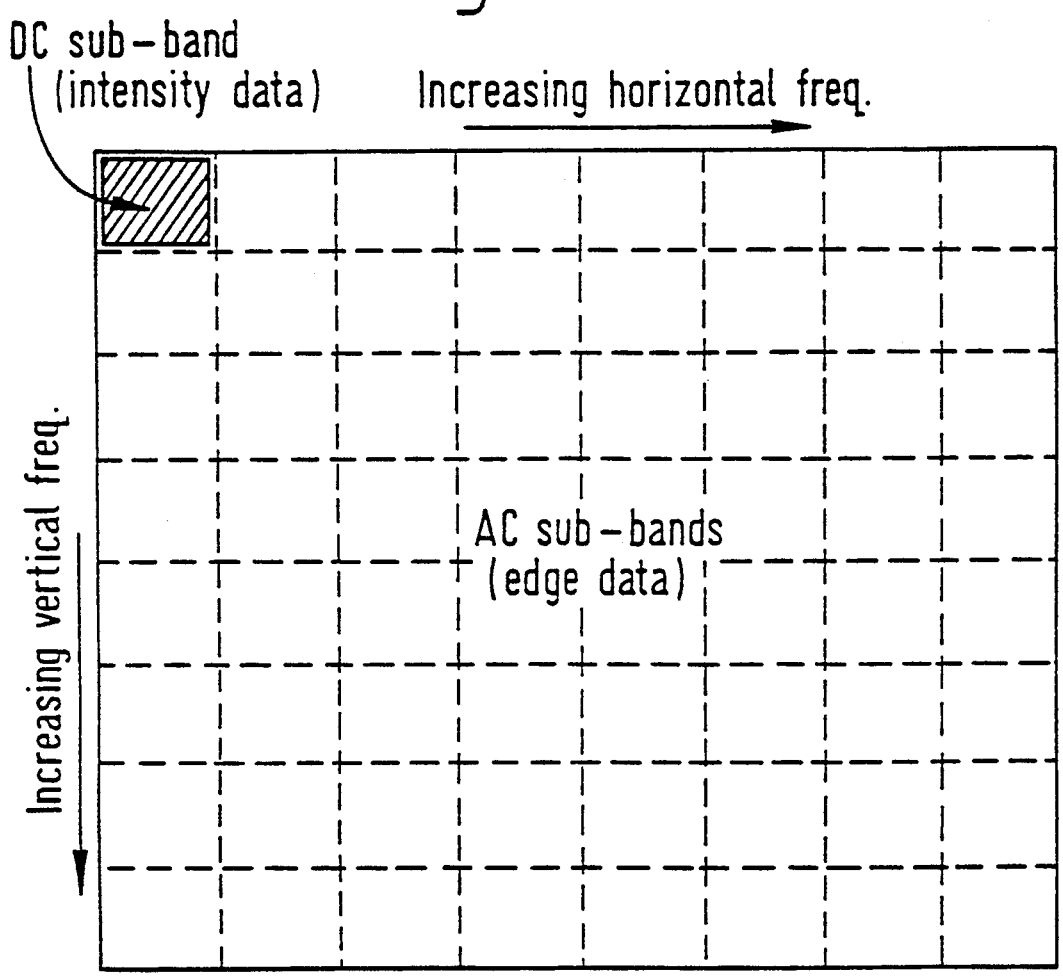
FIG. 6 illustrates a frequency separated video signal.

FIG. 6 illustrates the various sub-band components produced if the input luminance or chrominance data signal is decomposed both horizontally and vertically into eight frequency components (this can be considered to be the data stored in the output field store 54 after it has had the reordering of the output sequencer 56 applied to it). Each of these sub-bands or sub-pictures is represented by one of the blocks in FIG. 6. The upper left hand block represents the dc sub-band. This is the band of lowest horizontal and vertical frequency although in practice it does not necessarily represent only the constant portions of the signal with strictly zero frequency. This dc sub-band will contain the majority of the dc information of the original input image data. The relative importance of the remaining sub-bands to the eventual perception of the picture by a viewer varies. Generally speaking, the higher frequency sub-bands are less important to the eventual perception of a viewer. In relation to FIG. 6, the frequency which a particular sub-band component represents increases in moving downward and/of rightward in the array of blocks.

One array of sub-bands as shown in FIG. 6 is produced from the input luminance data in the luminance data compressor 2, and another is produced from the input chrominance data in the chrominance data compressor 4.

Figure 7:
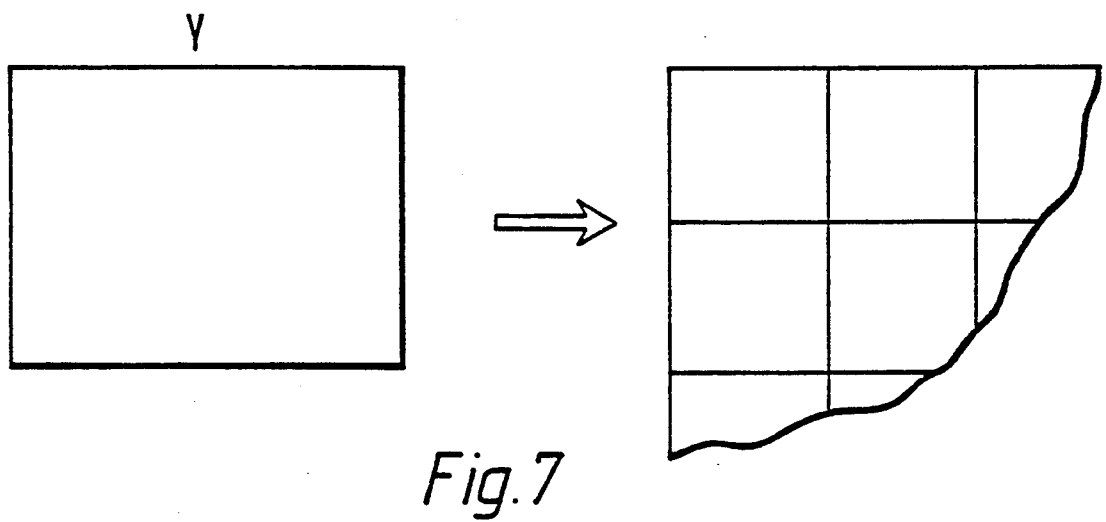
FIG. 7 illustrates the format of luminance data before and after frequency separation into sub-band components.
Figure 8:
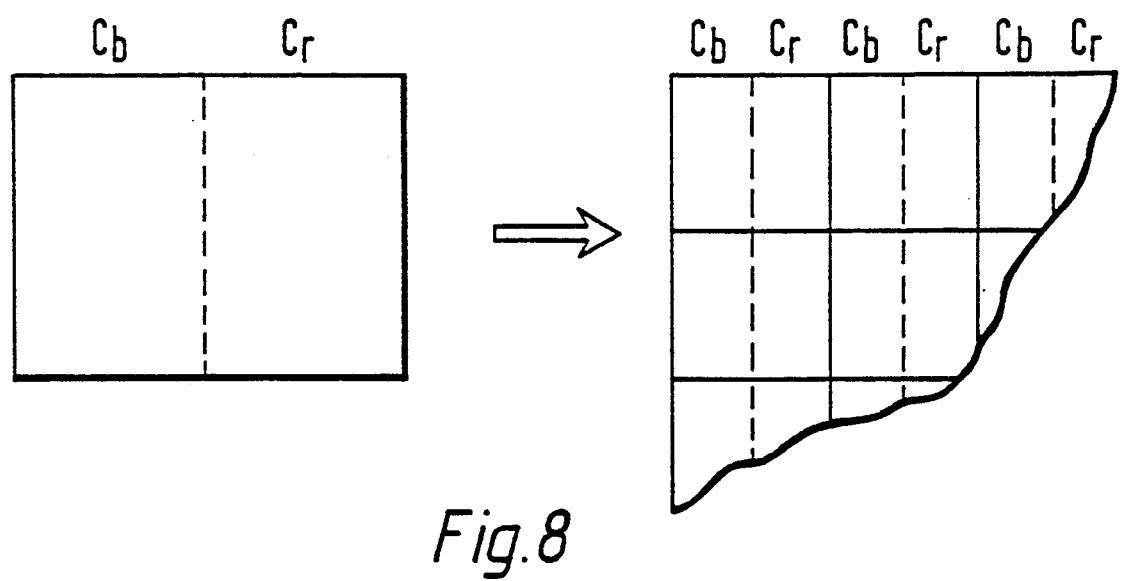
FIG. 8 illustrates the format of chrominance data before and after frequency separation into sub-band components.

FIGS. 7 and 8 illustrate the format of the luminance and chrominance input data and the effect of the separation of the data into sub-band components in the two-dimensional spatial frequency domain. The input (uncompressed) data is encoded according to an international standard format known as the CCIR Recommendation 601 format. This standard is applicable to 625 line/50 fields per second and 525 lines/60 fields per second video signals and defines the sample frequencies, the sample 'sites' and the number of quantising levels used.

FIG. 7 shows the input luminance data which is a digital representation of the luminance component of an image sampled at a predefined sample rate (13.5 MHz). On the right of FIG. 7 is a schematic representation of the sub-bands produced from the input luminance data by the two-dimensional decorrelator shown in FIG. 5.

Each sub-band represents a particular range of two-dimensional spatial frequency components of the input luminance data.

FIG. 8 shows the format of the chrominance data before and after frequency separation into sub-band components. Two colour difference signals Cb and CF ape shown, which ape related to conventional analogue colour difference signals U and V but are normalised to allow use of all of the available quantising levels. The colour difference signals Cb and Cr are sampled at one-half of the sampling rate of the luminance signals so that the digital samples corresponding to the two signals Cb and CF from a single image can be concatenated to form a composite block of data of the same size as that corresponding to the input luminance data from the image. This concatenation is performed on a line-by-line basis so that the input chrominance data (shown on the left of FIG. 8) can be considered to be comprised of two distinct sections representing Cb and Cr respectively. As shown in FIG. 8, the effect of sub-band decomposition on the composite chrominance data is to produce sub-bands each comprising two sections which represent a particular range of spatial frequency components of Cb and CF respectively.

Figure 9:
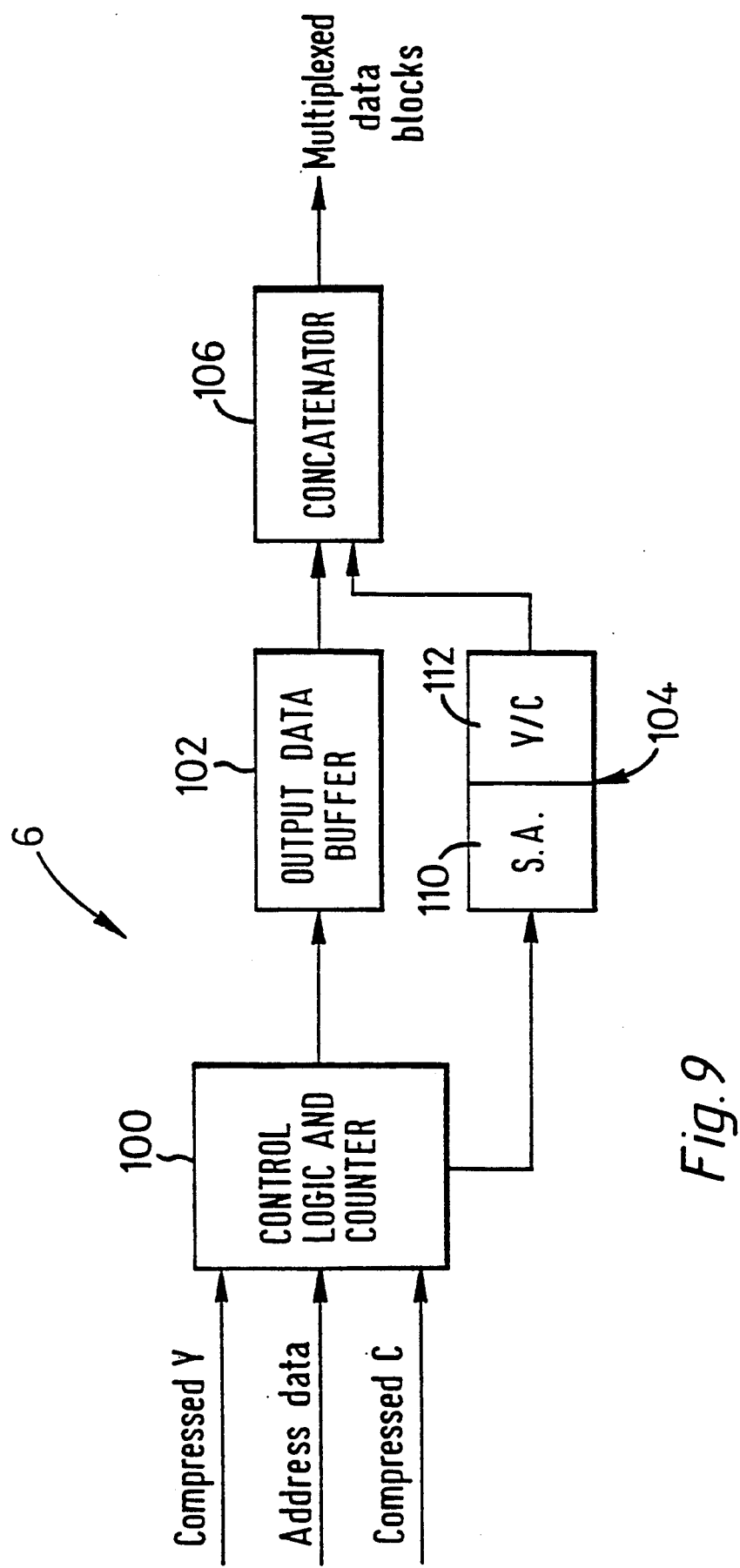
FIG. 9 is a schematic illustration of a data multiplexer.

FIG. 9 is a schematic illustration showing the data multiplexer 6 of FIG. 1 in more detail. In FIG. 9 a control logic and counter unit 100 is supplied with compressed luminance data from the luminance data compressor 2 in FIG. 1 and compressed chrominance data from the chrominance data compressor 4 in FIG. 1. The control logic and counter unit 100 also receives address data defining the position within the arrays of luminance and chrominance sub-bands of the luminance and chrominance data currently being supplied to the control logic and counter unit 100. This address data may be implicit, in that the compressed luminance and chrominance data are supplied in a predetermined order, or may be supplied explicitly. The compressed luminance and chrominance data are supplied to the control logic and counter unit 100 substantially in step with one another, so that data from corresponding positions in the array of luminance sub-bands and the array of chrominance sub-bands are supplied to the control logic and counter unit 100 at the same time and in the same order.

The control logic and counter unit 100 compiles a multiplexed data block in an output data buffer 102 and an output header buffer 104. When a complete multiplexed data block has been compiled the contents of the output header buffer 104 are concatenated with the contents of the output data buffer 102 by a concatenator 106 to form the multiplexed data block.

At the start of the compilation of a multiplexed data block the address or position in the arrays of sub-bands of the first luminance and chrominance data elements to be included in the multiplexed data block is derived by the control logic and counter unit 100 from the address data and stored in the output header buffer 104 as a start address 110. Compressed luminance data and compressed chrominance data are then stored in the output data buffer 102. The control logic and counter unit 100 comprises luminance and chrominance counters for maintaining a count of the amount of data stored in the output data buffer, in order to determine when sufficient data to produce a multiplexed data block of the predetermined size has been stored therein. When sufficient compressed luminance and compressed chrominance data has been stored in the output data buffer 102, the control logic and counter unit 100 generates a pointer value (a Y/C boundary pointer 112) for temporary storage in the output header buffer 104 which indicates the position in the multiplexed data block of the boundary between the luminance data and the chrominance data. Finally the contents of the output data buffer 102 and the output header buffer 104 are concatenated by the concatenator 106 in the following order: Header data (start address; Y/C boundary pointer); Compressed luminance data; Compressed chrominance data.

Figure 10:
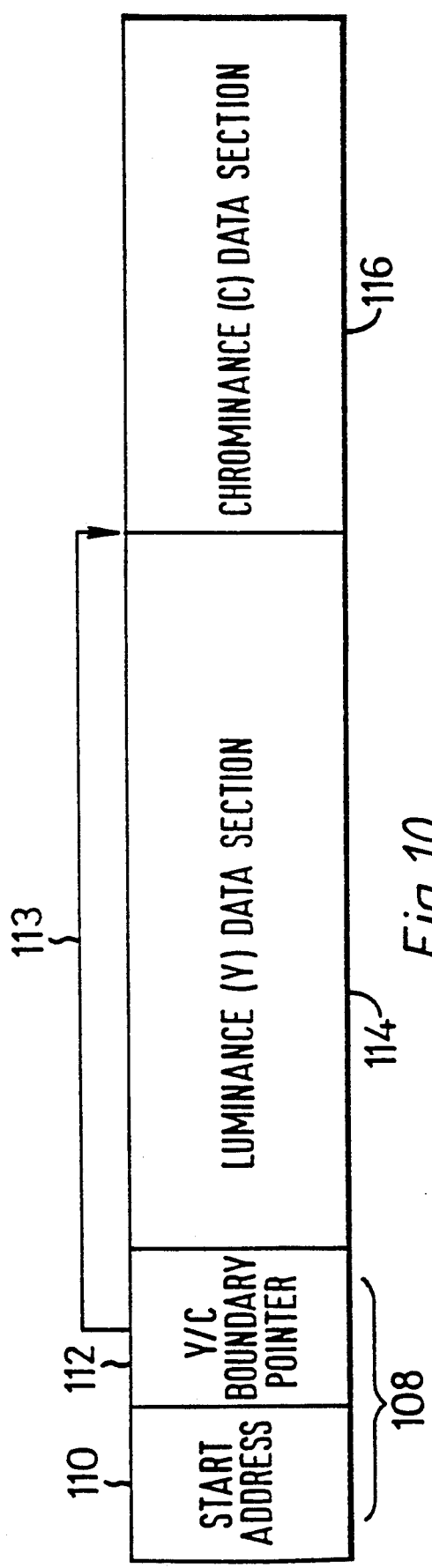
FIG. 10 illustrates the format of a multiplexed data block produced by the data multiplexer of FIG. 9.

FIG. 10 illustrates the format of a multiplexed data block produced by the data multiplexer shown in FIG. 9. As described above, the multiplexed data block starts with a block header 108 comprising a start address 110 and a Y/C boundary pointer 112. There then follows a luminance data section 114 and a chrominance data section 116. As shown by a schematic arrow 113, the Y/C boundary pointer 112 indicates the position in the multiplexed data block of the end of the luminance data section 114 and the start of the chrominance data section 116.

Figure 11:
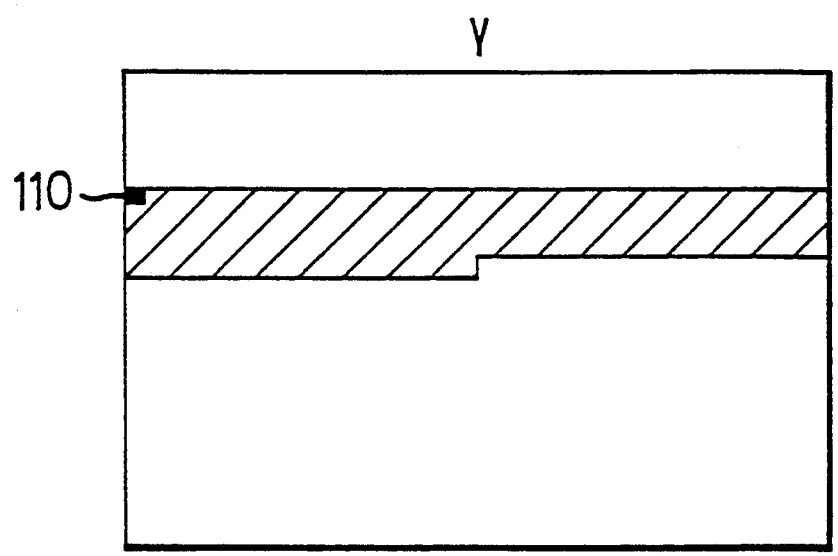
FIG. 11 illustrates a portion of the data from a single luminance sub-band included in a multiplexed data block.
Figure 12:
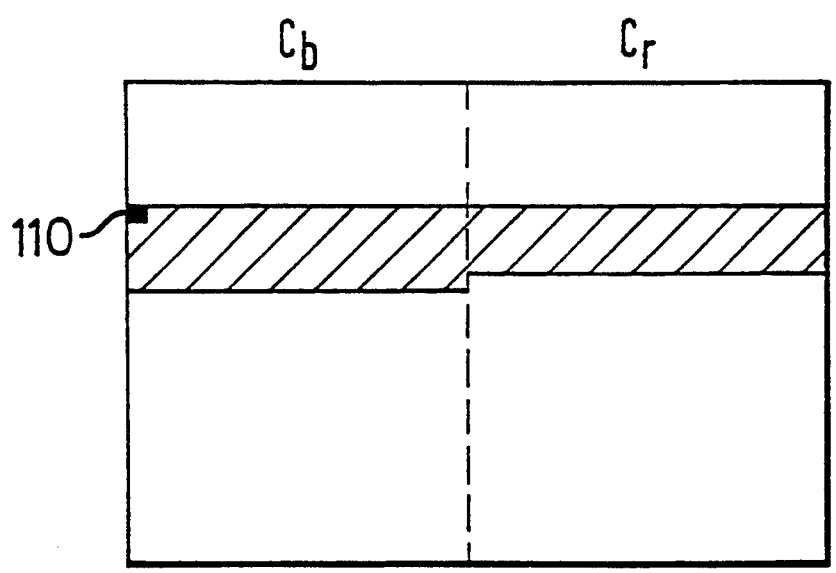
FIG. 12 illustrates a portion of the data from a single chrominance sub-band included in a multiplexed data block.

FIGS. 11 and 12 illustrate the manner in which corresponding portions of compressed luminance data and compressed chrominance data are included in a single multiplexed data block. The two figures show corresponding sub-bands from the array of luminance sub-bands and the array of chrominance sub-bands. The respective portions of data included in the multiplexed data block are shown as shaded portions on the figures and comprise a plurality of data elements arranged in a predetermined order. Also shown is the start address 110, which indicates the position of the first of the data elements in the portion in the predetermined order. Although the portions of data are of equal size in the array of sub-bands (i.e. before entropy encoding), after entropy encoding the two portions could be of different sizes depending on their luminance and chrominance information content.

Figure 13:
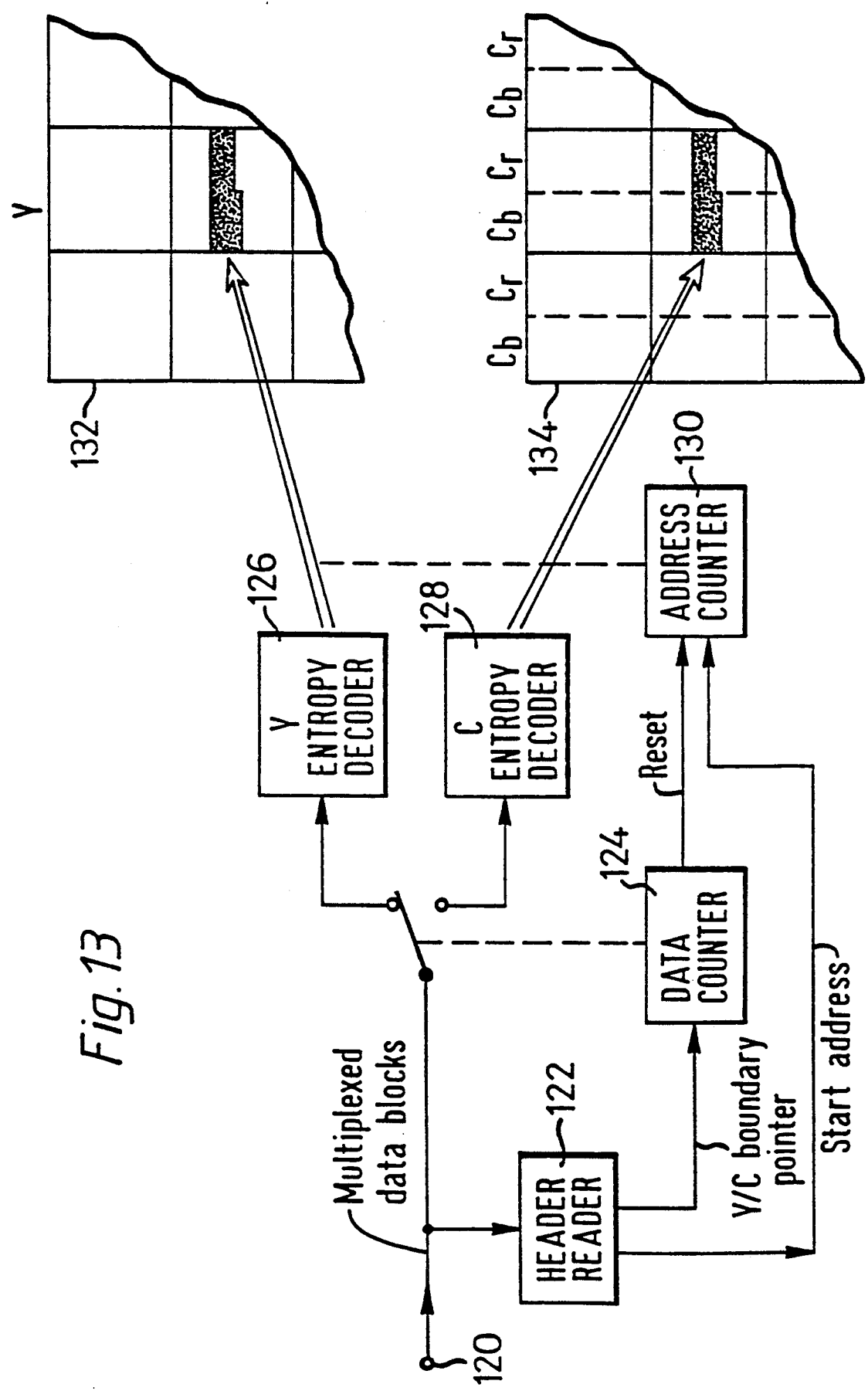
FIG. 13 is a schematic illustration of a data demultiplexer.

FIG. 13 is a schematic illustration of a data demultiplexer. Multiplexed data blocks are received on an input terminal 120 and are subjected to processing by a header reader 122 in order to recover the start address 110 and the Y/C boundary pointer 112 from the header 108 of the multiplexed data block. The Y/C boundary pointer is supplied to a data counter 124 which controls the supply of the compressed image data in the multiplexed data block to a luminance entropy decoder 126 or a chrominance entropy decoder 128 as appropriate. The data counter 124 achieves this by supplying the compressed image data initially to the luminance entropy decoder 126 while maintaining a count of the quantity of data supplied. This count is compared with the value of the Y/C boundary pointer 112 to determine when the end of the luminance data section has been reached. When the end of the luminance data section has been reached the data counter 124 controls the remainder of the image data from that multiplexed data block to be supplied to the chrominance entropy decoder 128.

The start address 110 derived by the header reader 122 is supplied to an address counter 130. The address counter 130 controls the writing of data output by the luminance entropy decoder 126 into a luminance frame store 132 and of data output by the chrominance entropy decoder 128 into a chrominance frame store 134. The address counter 130 controls the first item of data output by the luminance entropy decoder 126 to be stored in the luminance frame store 132 at a position corresponding to the start address 110. As each data item is output by the luminance entropy decoder 126, the address at which it is to be stored in the luminance frame store 132 is incremented by the address counter 130 in a predetermined order. This continues until the end of the luminance data section of the multiplexed data block is reached, at which point the data counter 124 sends a reset signal to the address counter 130. In response to the reset signal the address counter 130 resets its storage address to the start address 110 so that the first data item output by the chrominance entropy decoder 128 is stored at a position in the chrominance frame store 134 corresponding to the start address 110. As subsequent data items are output by the chrominance entropy decoder 128 the storage address in the chrominance frame store 134 is incremented by the address counter 130.

Figure 14:
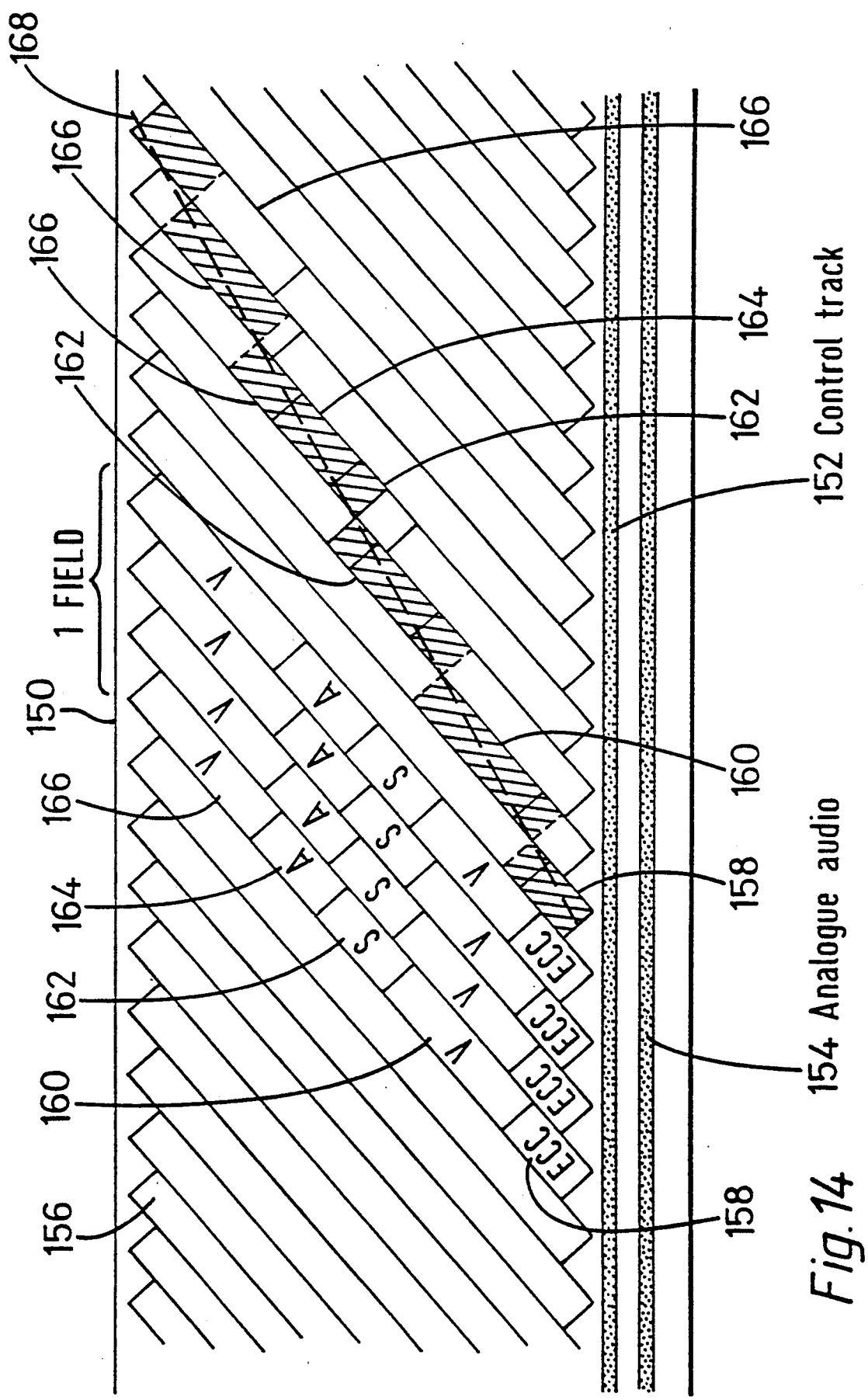
FIG. 14 is a schematic illustration of the format of a magnetic tape on which a plurality of multiplexed data blocks are recorded.

FIG. 14 is a schematic illustration of the format of a magnetic tape 150 on which a plurality of multiplexed data blocks are recorded. The magnetic tape has two longitudinal recording tracks for storing control and analogue audio information (the tracks 152 and 154 respectively) and a number of slant, helically scanned, tracks 156 for storing digital information.

Each of the slant tracks 156 is arranged as a number of sections, namely an error correcting code section 158, a video data section 160, a synchronisation section 162 storing digital synchronisation information, an audio data section 164 and a second video data section 166. The video, audio and synchronisation information stored on a group of four consecutive tracks represent one complete video field.

The two video data sections 160, 166 each comprise a large number (114) of adjacent multiplexed data blocks of the type described above. Similarly, the error correcting code section 158, the audio data section 164 and the synchronisation section 162 each comprise a number of adjacent data blocks of equal size to the multiplexed data blocks described above.

When a magnetic tape 150 recorded in this manner is being replayed at the same longitudinal tape speed as that used during recording of the tape, each slant track 156 is followed along its entire active length by a single rotary replay head. Assuming that the rotary replay heads follow a path from the bottom to the top of the magnetic tape 150 as shown in FIG. 14, each replay head would first read the data blocks in the error correcting code section 158, followed by the multiplexed data blocks in the video data section 160 and so on.

During shuttle replay of the magnetic tape 150 the longitudinal tape speed is higher than that used during recording of the tape. One result of this is that each replay head follows a path crossing more than one of the slant tracks 156. An example of such a path is shown as a broken line 168 in FIG. 14. The portions of the individual tracks 156 which would be read by a replay head following the path indicated by the broken line 168 are shown as shaded portions in the figure.

As a replay head crosses to a new track during shuttle replay and starts to read a portion of, for example, the video data section 160 on that track, it will read some or all of the multiplexed data blocks in that section. As described above, each multiplexed data block is self-contained in that it includes information from the same portion of the arrays of luminance and chrominance sub-bands and sufficient information (the start address 110 and the Y/C boundary pointer 112) that the luminance and chrominance information can be separately decoded by respective entropy decoders 126, 128 and stored at the appropriate positions in respective frame stores 132, 134 for subsequent processing. In this way, although all of the image data from a complete track may not be read during shuttle replay, substantially all of the multiplexed data blocks which are successfully read by a replay head can be decoded and used. Also, although during shuttle replay the arrays of luminance and chrominance sub-bands will each contain image information from a number of video fields, corresponding portions of the luminance sub-bands and the chrominance sub-bands will contain information from the same video field (i.e. from the same multiplexed data block). This can contribute to a reduction in the distortion of the luminance and chrominance pictures reconstructed from the sub-band information caused by shuttle replay.

Figure 15:
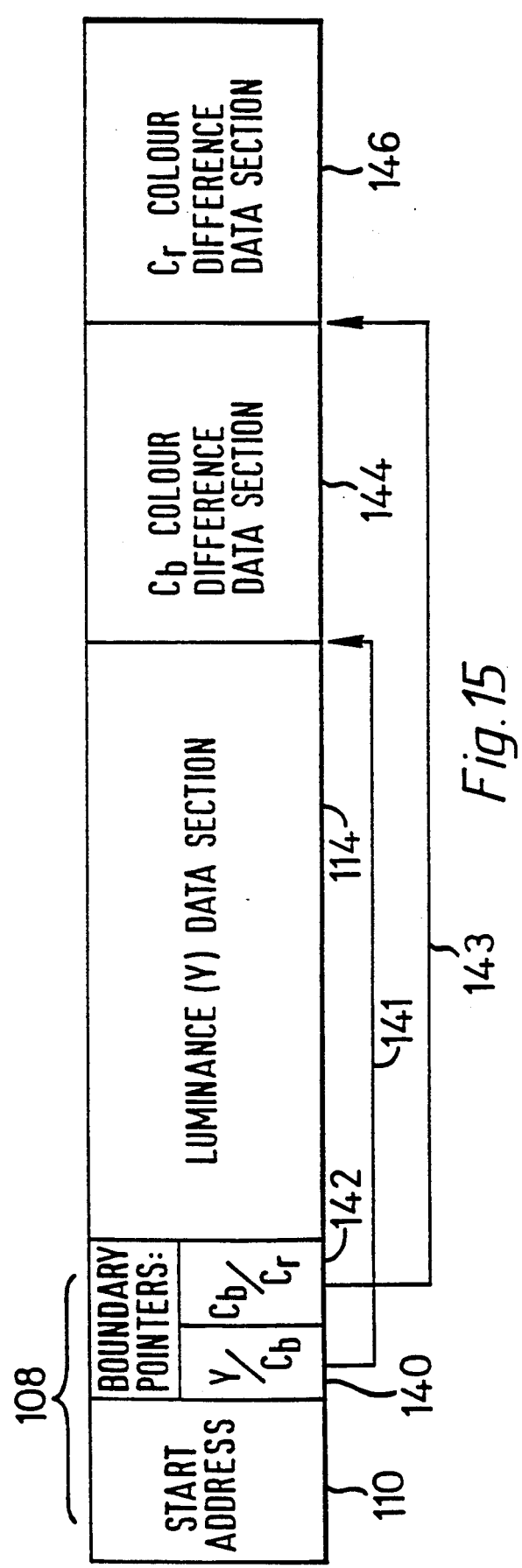
FIG. 15 illustrates an alternative format of a multiplexed data block.

FIG. 15 illustrates an alternative format of a multiplexed data block for use when the colour difference chrominance components Cb and Cr have been encoded separately. A header section is supplied as before, including a start address 110. However, the header section 108 now includes two boundary pointers, namely a Y/Cb boundary pointer 140, and a Cb/Cr boundary pointer 142. There then follows a luminance data section 114, a Cb colour difference data section 144, and a Cr colour difference data section 146. As shown by a schematic arrow 141, the Y/Cb boundary pointer 140 indicates the boundary between the luminance data section 114 and the Cb colour difference data section 144. Similarly, the Cb/Cr boundary pointer 142 indicates the boundary between the Cb colour difference data section 144 and the Cr colour difference data section 146 (shown by a schematic arrow 143).

A multiplexed data block as illustrated in FIG. 15 could be demultiplexed using a modified version of the data demultiplexer shown in FIG. 13, in which the data counter 124 receives the Y/C boundary pointer and the Cb/Cr boundary pointer and, in conjunction with the address counter 130, controls the decoding and storing of the Y, Cb and Cr components of the image data into three respective frame stores as appropriate.

In a further alternative embodiment there could be separate Cb and Cr data sections 144. 146 as shown in FIG. 15, but without the need for a Cb/Cr boundary pointer 142. Three frame stores (for the Y, Cb and Cr data) would then be required in the apparatus of FIG. 13. In this further embodiment the position of the boundary between the Cb and Cr data sections is derived as follows:

The start address 110 in the multiplexed data block is the same for the luminance data section and the two chrominance data sections, and represents the first position in the luminance and the chrominance frame stores at which the decoded luminance and chrominance data should be written. Similarly, the end addresses (i.e. the address of the last position in the respective frame store at which the decoded luminance and chrominance data are written) for the luminance and chrominance data from a single multiplexed data block are the same, because the luminance and chrominance data in a single multiplexed data block relate to corresponding portions of the luminance and chrominance image data (before entropy encoding).

As the luminance data section 114 is being decoded and stored in the luminance frame store 132, the address counter 130 in FIG. 13 stores the end address in the luminance frame store 132 of the luminance image data (this being derived from the start address and from the reset signal supplied by the data counter 124 when the end of the luminance data section in the multiplexed data block is reached). Data from the Cb data section are then decoded and stored, until that same end address is reached. The remainder of the image data in the multiplexed image block corresponds to Cr data and is decoded and stored as appropriate.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Image data multiplexing apparatus comprising: means for receiving digital luminance and chrominance data of a representation of an image, and means for multiplexing the received digital luminance and chrominance data into multiplexed data blocks of a predetermined length, said means for multiplexing being operable to form multiplexed data blocks, each of said multiplexed data blocks including:
   (i) a luminance data section comprising luminance data from a portion of said representation;
   (ii) a chrominance data section comprising chrominance data from said portion of said representation;
   (iii) a portion address indicative of a position in said representation of said portion; and
   (iv) a block offset pointer indicative of a position in said multiplexed data block of a boundary between said luminance data section and said chrominance data section.

2. Image data multiplexing apparatus according to claim 1, in which said representation includes frequency separated image data representing said image in a two-dimensional spatial frequency domain.

3. Image data multiplexing apparatus according to claim 2, in which said representation includes a plurality of sub-bands of said image in the two-dimensional spatial frequency domain.

4. Image data multiplexing apparatus according to claim 1, in which said representation includes a plurality of data elements having a predetermined order.

5. Image data multiplexing apparatus according to claim 1, in which said representation includes color difference data representing said image; and said chrominance data section includes a first data subsection and a second data subsection representing said color difference data from said portion of said representation.

6. Image data multiplexing apparatus according to claim 5, in which each of said multiplexed data blocks includes a chrominance offset pointer indicative of a position in the respective multiplexed data block of a boundary between said first data subsection and said second data subsection.

7. Image data multiplexing apparatus according to claim 1, further comprising means for concatenating a block header with said luminance and chrominance data sections, said block header including said portion address and said block offset pointer.

8. Image data multiplexing apparatus according to claim 7, in which the received digital luminance and chrominance data corresponds to positions in said representation; and further comprising a counter for determining when the quantity of said received data reaches a predetermined quantity; and means for controlling said concatenating means to concatenate said block header with said received data to form one of said multiplexed data blocks when said quantity of said received data reaches said predetermined quantity.

9. Image data multiplexing apparatus comprising:
   means for receiving data comprising luminance data and chrominance data from corresponding positions in a representation of an image; and
   means for multiplexing the received digital luminance and chrominance data of said representation into multiplexed data blocks of a predetermined length, each of said multiplexed data blocks including: (i) a luminance data section comprising luminance data from a portion of said representation, (ii) a chrominance data section comprising chrominance data from said portion of said representation, (iii) a portion address indicative of a position in said representation of said portion, and (iv) a block offset pointer indicative of a position in said multiplexed data block of a boundary between said luminance data section and said chrominance data section; said means for multiplexing including a counter for determining when the quantity of said received data reaches a predetermined quantity, said counter including a luminance data counter for detecting the quantity of received luminance data, a chrominance data counter for detecting the quantity of received chrominance data, means for comparing a sum of said quantities of received luminance data and received chrominance data with said predetermined quantity, and means for deriving said block offset pointer from said quantity of received luminance data; means for concatenating a block header with said luminance and chrominance data sections, said block header comprising said portion address and said block offset pointer; and means for controlling said concatenating means to concatenate said block header with said received data to form one of said multiplexed data blocks when said quantity of said received data reaches said predetermined quantity.

10. Image data demultiplexing apparatus for demultiplexing a multiplexed data block having luminance and chrominance data sections into digital luminance and chrominance data from a portion of a representation of an image, said image data demultiplexing apparatus comprising:
    a luminance data store;
    a chrominance data store;
    means for reading a portion address from said multiplexed data block;
    means for reading luminance data from said luminance data section and storing said luminance data in a portion of said luminance data store dependent on said portion address;
    means for reading chrominance data from said chrominance data section and storing said chrominance data in a portion of said chrominance data store dependent on said portion address; and
    means for reading from said multiplexed data block a block offset pointer indicative of a position in said multiplexed data block of a boundary between said luminance data section and said chrominance data section, for use in controlling the reading of said luminance data section and said chrominance data section in dependence on said block offset pointer.

11. Image data demultiplexing apparatus according to claim 10, in which said representation includes frequency separated image data representing said image in a two-dimensional spatial frequency domain.

12. Image data demultiplexing apparatus according to claim 11, in which said representation includes a plurality of sub-bands of said image in the two-dimensional spatial frequency domain.

13. Image data demultiplexing apparatus according to claim 10, further comprising means for reading a block header from said multiplexed data block, said block header includes said portion address and said block offset pointer.

14. Image data demultiplexing apparatus according to claim 10, in which said representation includes a plurality of data elements having a predetermined order.

15. Image data demultiplexing apparatus according to claim 10, in which said representation includes color difference data representing said image; and said chrominance data section includes a first data subsection and a second data subsection representing said color difference data from said portion of said representation.

16. Image data demultiplexing apparatus according to claim 15, further comprising:
   means for reading from said multiplexed data block a chrominance offset pointer indicative of a position in said multiplexed data block of a boundary between said first data subsection and said second data subsection.

17. Image data demultiplexing apparatus for demultiplexing a multiplexed data block having luminance and chrominance data sections into digital luminance and chrominance data from a portion of a representation of an image, in which said representation includes color difference data representing said image and said chrominance data section includes a first data subsection and a second data subsection representing said color difference data from said portion of said representation, said image data demultiplexing apparatus comprising:
   a luminance data store;
   means for reading a portion address from said multiplexed data block;
   means for reading from said multiplexed data block a block offset pointer indicative of a position in said multiplexed data block of a boundary between said luminance data section and said chrominance data section, for use in controlling reading of said luminance data section and said chrominance data section in dependence on said block offset pointer;
   means for reading luminance data from said luminance data section and storing said luminance data in a portion of said luminance data store dependent on said portion address;
   a first chrominance data store for storing chromiancne data from said first data subsection;
   a second chrominance data store for storing chrominance data from said second data subsection;
   means for detecting a portion end address representing an end of said portion of said luminance data store in which luminance data from each multiplexed data block is written;
   means for reading chrominance data from said chrominance data section and storing said chrominance data in said first chrominance data store based upon said portion address until an address in said first chrominance data store reaches said portion end address; and
   means for reading the remainder of said chrominance data in said chrominance data section and storing said chrominance data in said second chrominance data store based upon said portion address.

18. A method of multiplexing digital luminance and chrominance data of a representation of an image into multiplexed data blocks of a predetermined length, said method comprising the steps of:
   (i) writing luminance data from a portion of said representation to form a luminance data section in a multiplexed data block;
   (ii) writing chrominance data from said portion of said representation to form a chrominance data section in said multiplexed data block;
   (iii) writing a portion address to said multiplexed data block, said portion address being indicative of a position in said representation of said portion; and
   (iv) writing a block offset pointer to said multiplexed data block, said block offset pointer being indicative of a position in said multiplexed data block of a boundary between said luminance data section and said chrominance data section.

19. A method of demultiplexing a multiplexed data block having luminance and chrominance data sections into digital luminance and chrominance data from a portion of a representation of an image, said method comprising the steps of:
   reading a portion address from said multiplexed data block;
   reading from said multiplexed data block a block offset pointer indicative of a position in said multiplexed data block of a boundary between said luminance data section and said chrominance data section, for use in controlling reading of said luminance data section and said chrominance data section in dependence on said block offset pointer;
   reading luminance data from said luminance data section and storing said luminance data in a portion of a luminance data store dependent on said portion address;
   reading chrominance data from said chrominance data section and storing said chrominance data in a portion of a chrominance data store dependent on said portion address; and
   reading from said multiplexed data block a block offset pointer indicative of a position in said multiplexed data block of a boundary between said luminance data section and said chrominance data section, for use in controlling the reading of said luminance data section and said chrominance data section in dependence on said block offset pointer.

20. A multiplexed image data signal comprising a plurality of successive multiplexed data blocks of a predetermined length, each of said multiplexed data blocks comprising:
   (i) a luminance data section comprising luminance data from a portion of a representation of an image;
   (ii) a chrominance data section comprising chrominance data from said portion of said representation;
   (iii) a portion address indicative of a position in said representation of said portion; and
   (iv) a block offset pointer indicative of a position in said multiplexed data block of a boundary between said luminance data section and said chrominance data section.

21. A multiplexed image data signal according to claim 20, wherein said signal is recorded on a magnetic tape medium.

22. Image data multiplexing apparatus according to claim 1, wherein said apparatus is included in an image data recording/reproducing device.

23. Image data multiplexing apparatus according to claim 22, in which said image data recording/reproducing device includes a luminance data compressor operable to supply luminance data to said image data multiplexing apparatus, and a chrominance data compressor operable to supply chrominance data to said image data multiplexing apparatus.

24. Image data demultiplexing apparatus according to claim 10, wherein said apparatus is included in an image data recording/reproducing device.

25. Image data demultiplexing apparatus according to claim 24, in which said image data recording/reproducing device includes a luminance data decompressor operable to receive luminance data from said image data demultiplexing apparatus, and a chrominance data decompressor operable to receive chrominance data from said image data demultiplexing apparatus.

* * * * *